United States Patent [19]

Robbins

[11] 4,425,078

[45] Jan. 10, 1984

[54] AXIAL FLEXIBLE RADIALLY STIFF RETAINING RING FOR SEALING IN A GAS TURBINE ENGINE

[75] Inventor: Donald A. Robbins, South Windsor, Conn.

[73] Assignee: United Technologies Corporation, Hartford, Conn.

[21] Appl. No.: 170,251

[22] Filed: Jul. 18, 1980

[51] Int. Cl.³ .............................................. F01D 25/26
[52] U.S. Cl. ................................... 415/135; 415/134; 415/138; 415/174; 277/26
[58] Field of Search .................. 277/236, 26; 415/135, 415/174, 134, 138

[56] References Cited

U.S. PATENT DOCUMENTS

| | | | |
|---|---|---|---|
| 3,602,532 | 8/1971 | Ehrenberg | 277/236 |
| 4,083,647 | 4/1978 | Tatkov et al. | 415/113 |
| 4,311,432 | 1/1982 | Kildea | 415/139 |

OTHER PUBLICATIONS

*Formulas for Stress and Strain*, by Roark and Young, 5th Edition by McGraw Hill, p. 384.

Primary Examiner—Harvey C. Hornsby
Assistant Examiner—Brian J. Bowman
Attorney, Agent, or Firm—Gene D. Fleischhauer

[57] ABSTRACT

An annular ring 22 for an axial flow gas turbine engine disposed inwardly of an array of stator vanes 14 and between an annular flow path 18 for hot working medium gases and an annular flow path 20 for cooling air is disclosed. The ring abuttingly engages the array of stator vanes in the radial direction to provide radial support and abuttingly engages the array of stator vanes and an outer air seal block the intermixing of gases from the working medium flow path and gases from the cooling air flow path. The annular ring includes a first annular section 28 and a second annular section 30. The first annular section has an axial width to radial height ratio greater than one and the second annular section has an axial width to radial height ratio less than one to adapt the ring for axial flexibility and radial stiffness and to enable the ring to accommodate growth and axial growth between the outer air seal and the array of stator vanes while remaining within the elastic limit.

8 Claims, 6 Drawing Figures

AXIAL FLEXIBLE RADIALLY STIFF RETAINING RING FOR SEALING IN A GAS TURBINE ENGINE

DESCRIPTION

An Axially Flexible Radially Stiff Retaining Ring for Sealing in a Gas Turbine Engine

TECHNICAL FIELD

This invention relates to gas turbine engines, and more particularly to sealing components in such engines.

BACKGROUND ART

A gas turbine engine has a turbine section and a compression section both of which have rotating and stationary components. The rotating components are included in a rotor assembly and the non-rotating components are included in a stator assembly. An annular flow path for working medium gases extends axially through the engine and passes in alternating succession between components of the stator assembly and components of the rotor assembly. The stator assembly commonly includes an outer case which circumscribes the rotor assembly and the working medium flow path. Arrays of stator vanes extend inwardly from the outer case. The stator vanes direct the flowing working medium gases to preferred angles of attack with respect to downstream rotor blades. A portion of a turbine section of one such engine is shown in FIG. 6 (Prior Art). As shown in this drawing, the rearward portion of the stator vane is retained axially by the outer case and retained radially by an annular retaining ring which is loose axially at all times with respect to the array of stator vanes and an adjacent outer air seal. The annular ring is radially stiff such that the annular ring can exert a radial force without buckling against any vanes which pivot forwardly. Such a pivoting motion may occur when an engine surges and experiences reverse flow from the exhaust section towards the inlet.

To increase the service life of components in modern engines, cooling air is also flowed through passages on the interior of the case. The cooling air removes heat from the case and from the outer air seals and stator vanes which are in intimate contact with the hot working medium gases. Often, the case forms the outer boundary of the cooling air flow path and portions of the stator vanes and the outer air seals form the inner boundary of the cooling air flow path. In the interests of engine efficiency, it is desirable to separate the cooling air flow path from the hot working medium gases. Accordingly, sealing is provided by an annular ring between an array of stator vanes and the adjacent outer air seal. For sealing to be effective the ring must accommodate relative axial and radial movement between the annular array of stator vanes and the annular outer air seal. However, adapting the ring to accommodate axial and radial movement must not be at the expense of radial stiffness which enables the ring to provide the radial retaining force to the stator vanes.

DISCLOSURE OF INVENTION

According to the present invention, an annular ring for sealing in a gas turbine engine between two annular stator structures which are susceptible to relative axial and radial movement is formed of a first annular section having an axial width to radial height ratio which is greater than one and a second annular section having an axial width to radial height ratio which is less than one to enable the ring to stiffly support one of the structures in the radial direction and to elastically accommodate relative thermal growth between the structures.

In accordance with one embodiment of the present invention, the ring has an I-shaped cross section formed of an outer cylinder having an axially facing surface, an inner cylinder having an axially facing surface and a radial plate extending between the cylinders which is supported in a guided condition by the cylinders to enable the ring to orient each of the axially facing surfaces parallel to an abutting surface of a corresponding stator structure during operative conditions.

A primary feature of the present invention is an annular ring extending between two annular stator structures. The ring has two annular sections: a first section having an axial width to radial height ratio greater than one; a second section having an axial width to radial height ratio less than one. The ring is slidable on one of the annular stator structures. The ring operatively engages the other annular stator structure in axial and radial abutting contact. In one embodiment, the ring has a third section in abutting contact with the second annular stator structure. The third section has an axial width to radial height ratio greater than one.

A principal advantage of the present invention is the increase in engine efficiency which results from blocking the unwanted leakage of a fluid in the engine between two annular stator structures. Sealing is maintained and relative growth between the annular stator structures is elastically accommodated by the axial flexibility of the annular ring and the radially slidable engagement between the seal ring and one of the annular stator structures. Radial support of the other stator structure without buckling results from the radial stiffness of the annular ring.

The foregoing, and other features and advantages of the present invention, will become more apparent in the light of the following description and accompanying drawing.

BEST MODE FOR CARRYING OUT THE INVENTION

Figure 1:
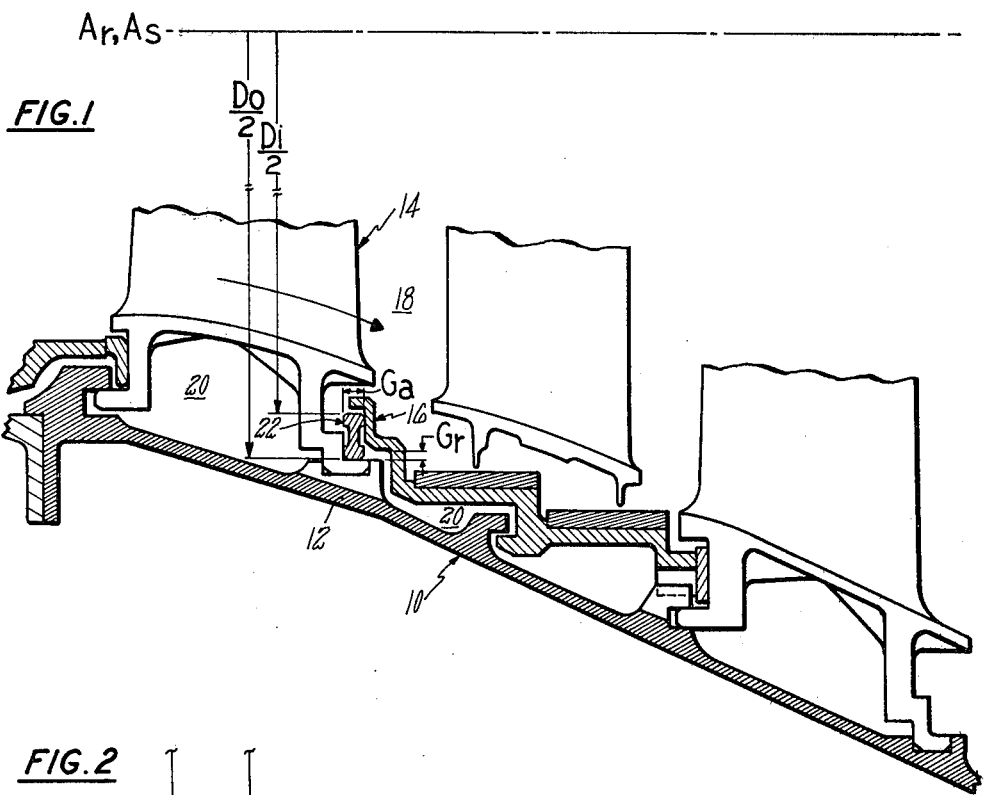
FIG. 1 is a simplified cross section view of a portion of an axial flow gas turbine engine showing a portion of the stator assembly of the engine.

FIG. 1 shows a portion of an axial flow gas turbine engine having an axis of rotation $A_r$. The engine has a stator assembly 10 a portion of which is shown. The stator assembly includes an outer case 12 and annular stator structures extending circumferentially about the axis of rotation $A_r$. A first annular stator structure such as an array of stator vanes represented by the single vane 14 extends circumferentially about the interior of the outer case. A second annular stator structure such as the outer air seal 16 extends circumferentially about the interior of the outer case and is free to move radially and axially with respect to the array of stator vanes 14. An annular flow path 18 for working medium gases extends axially through the engine inwardly of a portion of the stator vanes and the outer air seal. A flow path 20 for cooling air extends axially through the engine outwardly of the array of stator vanes and the outer air seal. The annular outer air seal is spaced axially and radially from the array of stator vanes in the installed condition leaving an axial gap $G_a$ and a radial gap $G_r$ therebetween. A free standing annular ring 22 for sealing and retention extends axially and radially between the annular outer air seal and the array of stator vanes. The annular ring has an axis of symmetry $A_s$. The axis of symmetry $A_s$ of the annular ring is parallel to the axis of rotation $A_r$ of the engine.

Figure 2:
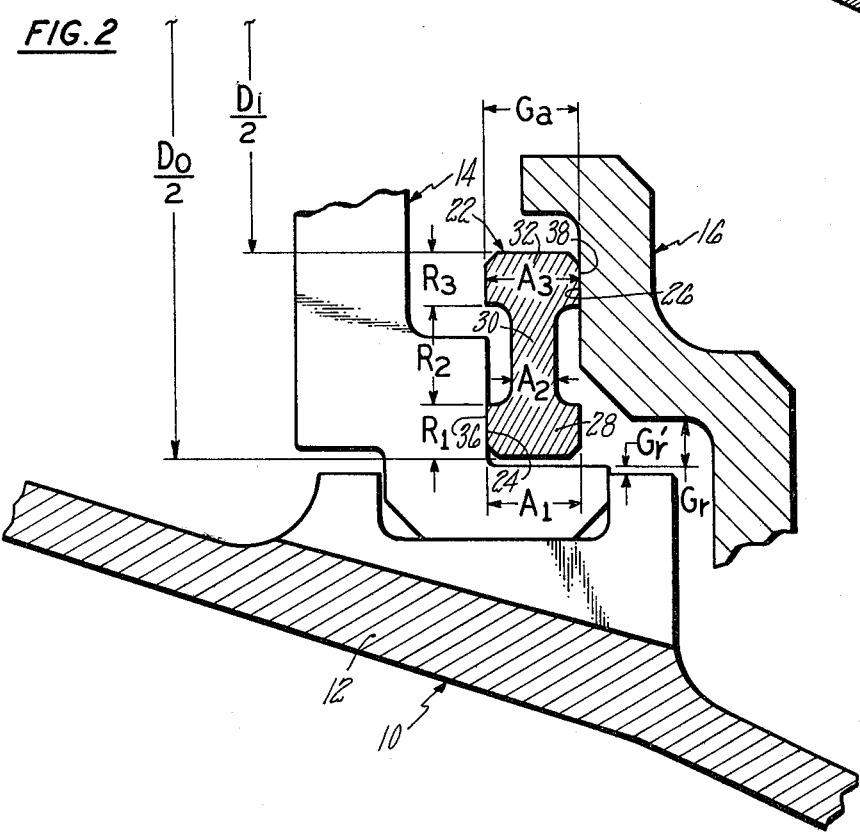
FIG. 2 is an enlarged sectional view of a portion of the stator assembly and shows the outer case and annular arrays of stator structure extending inwardly therefrom.

As shown in FIG. 2, in the installed condition the annular ring 22 abuttingly engages the array of stator vanes 14 at a first zone of axial contact 24 in a first axial direction. And, the ring abuttingly engages the outer air seal 16 at a second zone of axial contact 26 in a second axial direction. The annular ring is adapted to abuttingly engage the vanes in the radial direction. The annular ring has a radial stiffness characteristic proportional to the rectangular moment of inertia $I_r$ (inches$^4$) about a neutral surface parallel to the axis of symmetry $A_s$ of the ring. The annular ring has an axial stiffness characteristic proportional to the rectangular moment of the inertia $I_a$ (inches$^4$) about a neutral surface perpendicular to the axis of symmetry $A_s$ of the annular ring.

The axial stiffness characteristic and the radial stiffness characteristic result from the cross section geometry of the annular sections which form the ring. The ring is formed of a first annular section 28, a second annular section 30 and a third annular section 32. The first annular section has an axial width $A_1$, a radial height $R_1$ and an axial width to radial height ratio which is greater than one ($A_1/R_1 > 1.0$). The first annular section has an axially facing surface 36 facing in the first axial direction. The axially facing surface adapts the annular ring 22 to abuttingly engage the array of stator vanes in the first axial direction. The first annular section is spaced radially in the installed condition from the first annular stator structure leaving a radial gap $G_r'$ therebetween and adapts the annular ring to abuttingly engage the array of stator vanes in the radial direction during operation.

The second annular section 30 of the annular ring 22 extends between the first annular section 28 and the third annular section 32. The second annular section is adapted for axial flexibility between the first zone of axial contact 24 and the second zone of axial contact 26. The second annular section has an axial width $A_2$ which is less than the axial width $A_1$ of the first annular section ($A_2 < A_1$), a radial height $R_2$ and an axial width to radial height ratio which is less than one ($A_2/R_2 < 1.0$).

The third annular section has an axially facing surface 38 which faces in a second axial direction. The axial distance between the surface 36 on the first annular section and the surface 38 on the third annular section is equal to the axial gap $G_a$. The axially facing surface on the third annular section adapts the annular ring to abuttingly engage the annular outer air seal in the second axial direction at the second zone of axial contact 26 and to slidably engage the second annular structure in the radial direction. The third annular section is adapted to resist rolling of the annular ring. Rolling is defined as the tendency of the ring to turn inside out in response to external forces. Rolling is discussed in Roark and Young *Formulas for Stress and Strain,* McGraw Hill Book Company (Fifth Edition, 1975), pg. 384. The third annular section has a radial height $R_3$, an axial width $A_3$ and has an axial width to radial height ratio which is greater than one ($A_3/R_3 > 1.0$). The axial width $A_3$ of the third annular section 32 is greater than the axial width $A_2$ of the second annular section ($A_3 > A_2$). As shown, the annular ring 22 has an axial width $A_3$ of the third annular section which is equal to the axial width $A_1$ of the first annular section. The axial width $A_3$ to radial height $R_3$ ratio of the third annular section is equal to the axial width to radial height ratio of the first annular section ($A_3/R_3 = A_1/R_1$).

One embodiment of the annular ring 22 found to be satisfactory in accommodating an axial deflection of fifteen to thirty thousandths (0.015–0.030) of an inch was an annular ring 22 having: an outside diameter $D_o$ of twenty-eight and sixty-two thousandths (28.62) of an inch; an axial width $A_2$ of the second annular section 30 of fifty-five thousandths (0.055) of an inch; an inside diameter $D_i$ to outside diameter ratio greater than or equal to nine tenths ($D_i/D_o \geq 0.9$) and in this particular embodiment ninety-eight hundredths ($D_i/D_o = 0.98$); a ratio of the axial width $A_2$ of the second annular section 30 to the axial width $A_1$ of the first annular section 28 equal to forty-five hundredths ($A_2/A_1 = 0.45$); a ratio of the axial width $A_1$ to the radial height $R_1$ of the first annular section equal to one and three quarters ($A_1/R_1 = 1.75$); and a ratio of the axial width $A_2$ to the radial height $R_2$ of the second annular section equal to forty-one hundredths ($A_2/R_2 = 0.41$). Materials known to be effective are the iron base alloys AMS (Aerospace Material Specification) 5525, AMS 5731 or AMS 5805.

Figure 3:
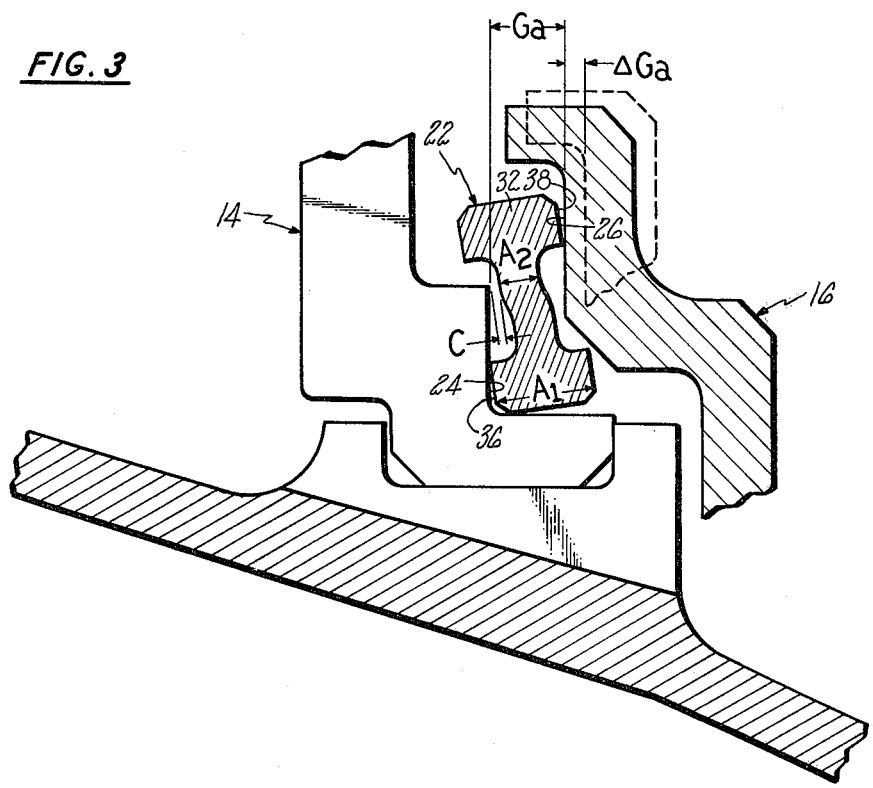
FIG. 3 corresponds to the FIG. 2 view, illustrating the orientation of an annular ring during operative conditions.

FIG. 3 shows the FIG. 2 view during operation of a gas turbine engine. Relative thermal growth of the outer air seal 16 and the annular ring 22 with respect to the array of vanes 14 causes the ring 22 to assume a deflected position. The deflected position is shown in exaggerated fashion in FIG. 3. The original position of the outer air seal and the annular ring with respect to the array of stator vanes is shown by broken lines.

Figure 4:
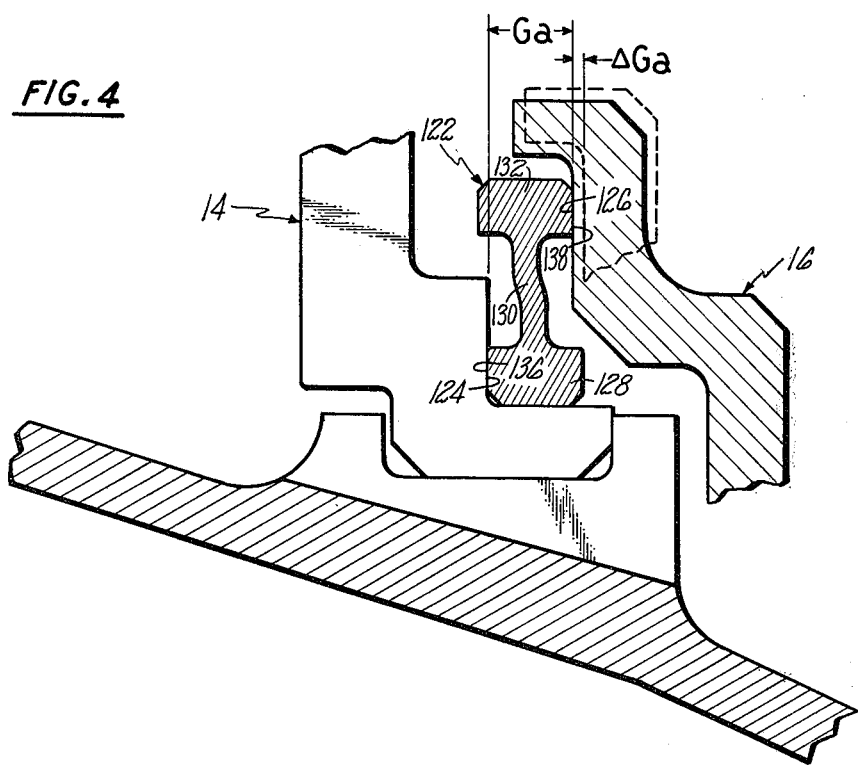
FIG. 4 is a cross section view corresponding to the FIG. 3 view showing an alternate embodiment.

FIG. 4 shows an alternate embodiment of the FIG. 2 construction having a second annular section 130 of reduced axial width $A_2$ and increased radial height $R_2$ as compared with the FIG. 2 embodiment. The first annular section 128 is a cylinder. The cylinder has an axial stiffness characteristic and an axially facing surface 136. The third annular section 132 is also a cylinder having an axial stiffness characteristic and an axially facing surface 138 which faces in a second axial direction. The second annular section 130, which performs in a similar fashion to other second annular sections, is a radial plate extending between the cylinders. The second annular section is supported in a guided condition by the cylinders. The axial stiffness characteristic of the cylinders adapts the ring to orient during operation each of the axially facing surfaces parallel to a corresponding zone of axial contact on a corresponding annular stator structure.

Figure 5:
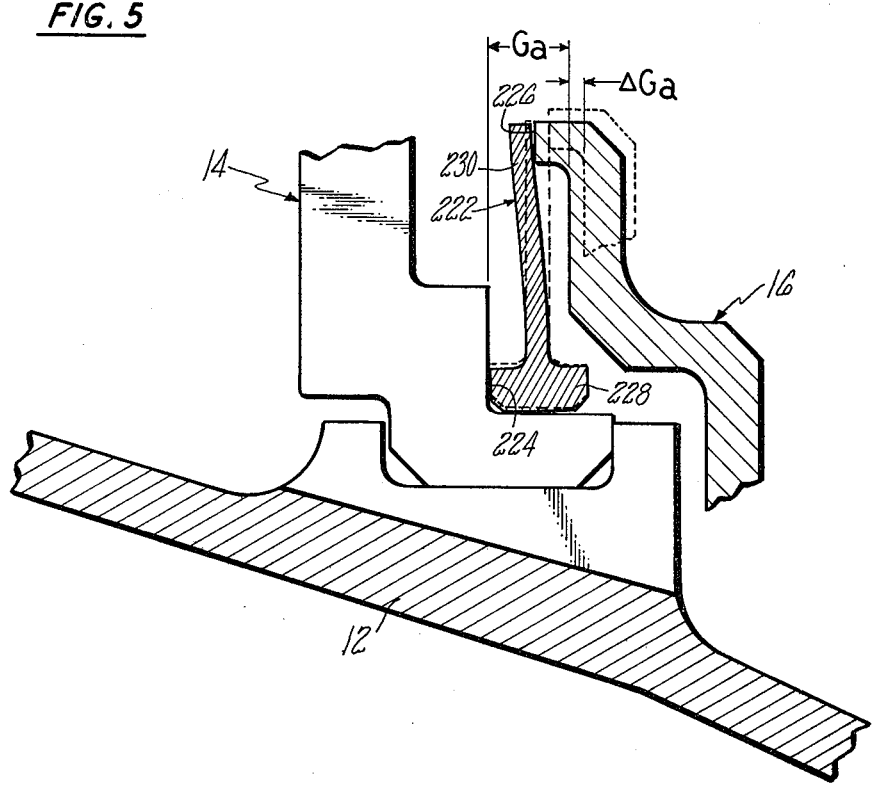
FIG. 5 is a cross section view corresponding to the FIG. 2 view showing a second alternate embodiment.
Figure 6:
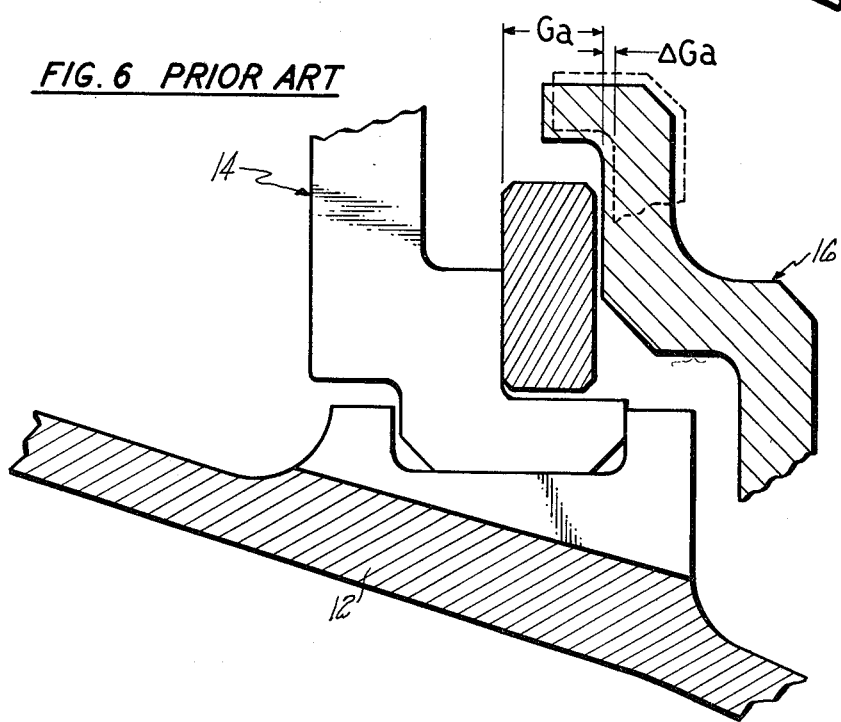
FIG. 6 (Prior Art) is a construction which corresponds to the FIG. 2 view.

FIG. 5 is an alternate embodiment 222 of the annular ring of FIG. 2 having a second annular section 230 which is adapted to engage a second annular stator structure such as the outer air seal 16. The first annular section 228 is adapted to abuttingly engage the first annular stator structure in the radial direction and the first axial direction. The first annular section has an axial width $A_1$, a radial height $R_1$ and an axial width to radial height ratio which is greater than one ($A_1/R_1 > 1.0$). The second annular section is adapted for axial flexibility between the first zone of axial contact 224 and the second zone of axial contact 226, having an axial width $A_2$ which is less than the axial width $A_1$ of the first annular section ($A_2 < A_1$), a radial height $R_2$ and an axial width to radial height ratio which is less than one ($A_2/R_2 < 1.0$).

One embodiment of the annular ring 222 found to be satisfactory in accommodating an axial deflection of fifteen to thirty thousandths (0.015–0.030) of an inch was an annular ring 122 having: an outside diameter $D_o$ of twenty seven and six hundred and sixteen thousandths (27.616) of an inch; an axial width of the second annular section of fifty-five thousandths of an inch (0.055); an inside diameter $D_i$ to outside diameter $D_o$ ratio greater than or equal to nine tenths ($D_i/D_o \geq 0.9$) and in this particular embodiment equal to ninety-seven hundreths ($D_i/D_o = 0.97$); a ratio of the axial width $A_2$ of the second annular section 230 to the axial width $A_1$ of the first annular section 228 equal to thirty-four hundreths ($A_2/A_1 = 0.34$); a ratio of the axial width $A_1$ to the radial height $R_1$ of the first annular section equal to three and six tenths ($A_1/R_1 = 3.6$); a ratio of the axial width $A_2$ to the radial height $R_2$ of the second annular section equal to sixteen hundreths ($A_2/R_2 = 0.16$). A material known to be effective for the annular ring 222 is the nickel base alloy AMS (Aerospace Material Specification) 5707.

During operation of the gas turbine engine, hot working medium gases are flowed along the annular flow path 18. Cooling air is flowed along the annular flow path 20 outwardly of the annular flow path 18. Heat is transferred between these gases and turbine components such as the array of stator vanes 14, the outer air seal 16 and the annular ring 22 causing the components to experience differential thermal growth. This growth causes relative movement between the turbine components. The annular ring and the outer air seal move axially and radially with respect to the array of stator vanes changing the axial gap $G_a$ and the radial gap $G_r$. The slidable engagement between the annular ring 22 and the outer air seal 16 enables the ring to accommodate changes in the radial gap $G_r$. The annular ring in intimate contact with the hot working medium gases and to a lesser degree in contact with the cooling air expands outwardly. The slidable engagement between the annular ring and the outer air seal enables the ring to press tightly against the array of stator vanes. Because the thermal environment and the coefficient of thermal expansion of the ring is known, the ring exerts a predetermined radial force against the array of stator vanes. The ring does not buckle under this predetermined force because of the radial stiffness characteristics selected for the annular ring and implemented with its particular cross sectional geometry. The radial force exerted by the annular ring resists the tendency of the vanes to rotate inwardly away from the outer case 12 in response to changes in pressure across the stator vanes and vibrations in the outer case 12 such as occur during surge.

As the axial gap $G_a$ between the outer air seal 16 and the array of stator vanes 14 decreases, the annular ring 22 is urged rearwardly by the array of stator vanes and forwardly by the outer air seal. The axial stiffness characteristic of the annular ring enables the ring to exert a predetermined axial force for sealing against the abutting array of stator vanes and the abutting outer air seal and to elastically deflect in the axial direction to accommodate the decrease $\Delta G_a$ in the axial gap $G_a$. As can be seen from FIG. 3, the axial stiffness characteristic of the third annular section 32 resists rolling and the axial stiffness characteristic of the second annular section 30 enables the second annular section to axially flex with respect to the first and third annular sections. The second annular section elastically deflects to accommodate a portion of the decrease in the axial gap $\Delta G_a$ and the ring rolls to accommodate the remaining portion of the decrease. The difference in axial width $A_1$ of the first annular section and the axial width $A_2$ of the second annular section provides a clearance C between the second annular section and the vanes to permit the ring to roll and deflect without interference from the vanes.

As shown in FIG. 4, the axial stiffness characteristic of the second annular section is reduced further as compared with the showing in FIG. 3 by reducing the axial width $A_2$ and increasing the radial height $R_2$. The decrease in the axial gap $\Delta G_a$ results in a deflection in the second annular section. The axial stiffness characteristic of the first annular section and the third annular section cause the first and third annular sections to support the second annular section in a guided condition which prevents rotation of the inner edge and the outer edge of the neutral surface of the second annular section. As a result, the ring orients each of the axially facing surfaces 136, 138 parallel to the zone of axial contact between each of the surfaces and the corresponding annular stator structure. The wider sealing surface further inhibits leakage as compared with those constructions in which the zone of axial contact between the annular ring and the abutting annular stator structures approaches that of a line to line contact.

As shown in FIG. 5, the annular ring 222 performs in a similar fashion to the ring shown in FIG. 2. The ring rolls and deflects axially to accommodate the change $\Delta G_a$ in the axial gap $G_a$. The first annular section abuttingly engages the array of stator vanes and resists rolling of the ring at the outer diameter. The second annular section abuttingly engages the outer air seal for sealing. The ring is radially stiff to exert a radial force against the array of stator vanes 14.

Although the invention has been shown and described with respect to preferred embodiments thereof, it should be understood by those skilled in the art that various changes and omissions in the form and detail thereof may be made therein without departing from the spirit and the scope of the invention.

I claim:

1. For a gas turbine engine of the type having a first annular stator structure, and a second annular stator structure spaced axially and radially from the first annular structure leaving an axial gap $G_a$ and a radial gap $G_r$ therebetween which change during operative conditions and having a radially free standing annular ring which restrains radially the first structure during operative conditions, the improvement which comprises: a radially free standing annular ring which is adapted to abuttingly engage the first annular stator structure in a first axial direction at a first zone of axial contact, to abuttingly engage the second annular stator structure in a second axial direction at a second zone of axial contact and to slidably engage the second annular structure in the radial direction, the ring having a radial stiffness characteristic, an axial stiffness characteristic and being formed of

[a] *an outermost* first annual section which is adapted to abuttingly engage the first annular stator structure in the radial direction and the first axial direction and which has an axial width $A_1$, a radial height $R_1$ and an axial width to radial height ratio which is greater than one ($A_1/R_1 > 1.0$), and a second annular section adapted for axial flexibility between the first zone of axial contact and the second zone of axial contact, *the second annular section being attached to extending inwardly from the first annular section, the second annular section* having an axial width $A_2$ which is less than the axial width $A_1$ of the first annular section ($A_2 < A_1$), a radial height $R_2$, and an axial width to radial height ratio which is less than one ($A_2/R_2 < 1.0$), wherein the radial stiffness characteristic of the annular ring and the slidable engagement between the annular ring and the second annular stator structure adapts the ring to accommodate changes in the radial gap G, and to exert a predetermined radial force against the first annular stator structure without buckling, the axial stiffness characteristic of the annular ring adapts the ring to exert a predetermined axial force for sealing against the abutting first annular structure and the second annular structure in response to operative decreases in the axial gap $G_a$, and the axial stiffness characteristic adapts the ring to elastically deflect in the axial direction to accommodate decreases in the axial gap $G_a$.

2. The radially free standing annular ring as claimed in claim 1 wherein the second axial direction is directly opposite to the first axial direction.

3. The radially free standing annular ring as claimed in claim 1 wherein the second annular section is adapted to engage the second annular stator structure.

4. The radially free standing annular ring as claimed in claim 1 wherein the ring is further formed of a third annular section which is adapted to engage the second annular stator structure and to resist rolling and which has a radial height $R_3$, an axial width $A_3$ which is greater than the axial width $A_2$ of the second annular section ($A_3 > A_2$) and which has an axial width to radial height ratio which is greater than one ($A_3/R_3 > 1.0$).

5. The radially free standing annular ring as claimed in claim 4 wherein the axial width $A_3$ of the third annular section is equal to the axial width $A_1$ of the first annular section and wherein the axial width to radial height ratio of the third annular section is equal to the axial width to radial height ratio of the first annular section ($A_3/R_3 = A_1/R_1$).

6. The radially free standing annular ring as claimed in claim 5 wherein the ring has an inner diameter $D_i$, an outer diameter $D_o$, the ratio of $D_i$ to $D_o$ is greater than or equal to nine tenths ($D_i/D_o \geq 0.9$), the ratio of the axial width $A_2$ of the second annular section to the axial width $A_1$ of the first annular section is forty-five hundredths ($A_2/A_1 = 0.45$), the ratio of the axial width $A_1$ to the radial height $R_1$ of the first annular section is one and three quarters ($A_1/R_1 = 1.75$), and the ratio of the axial width $A_2$ to the radial height $R_2$ of the second annular section is forty-one hundredths ($A_2/R_2 = 0.41$).

7. The radially free standing annular ring as claimed in claim 3 wherein the ring has an inner diameter $D_i$, an outer diameter $D_o$, the ratio of $D_i$ to $D_o$ is greater than or equal to nine tenths ($D_i/D_o \geq 0.9$), the ratio of the axial width $A_2$ of the second annular section to the axial width $A_1$ of the first annular section is thirty-four hundredths ($A_2/A_1 = 0.34$), the ratio of the axial width $A_1$ to the radial height $R_1$ of the first annular section is three and six tenths ($A_1/R_1 = 3.6$), and the ratio of the axial width $A_2$ to the radial height $R_2$ of the second annular section is sixteen hundredths ($A_2/R_2 = 0.16$).

8. The radially free standing annular ring as claimed in claim 5 wherein the first annular section is a cylinder having an axial stiffness characteristic and an axially facing surface which faces in the first axial direction, the third annular section is a cylinder having an axial stiffness characteristic and an axially facing surface which faces in the second axial direction, and the second annular section is a radial plate extending between the cylinders which is supported in a guided condition by the cylinders, and wherein the axial stiffness characteristic of the cylinders adapts the ring to orient each of the axially facing surfaces parallel to a zone of axial contact on a corresponding annular stator structure.

* * * * *

UNITED STATES PATENT AND TRADEMARK OFFICE
CERTIFICATE OF CORRECTION

PATENT NO. : 4,425,078

DATED : January 10, 1984

INVENTOR(S) : Donald A. Robbins

It is certified that error appears in the above-identified patent and that said Letters Patent is hereby corrected as shown below:

Column 7, line 4:  before "an" delete --[a]--

Column 7, line 4:  after "first" change "annual" to --annular--

Column 7, line 13: after "to" insert --and--

Column 7, line 23: after "gap" change "G," to --$G_r$--

Signed and Sealed this

Twenty-fifth Day of December 1984

[SEAL]

Attest:

GERALD J. MOSSINGHOFF

*Attesting Officer*  *Commissioner of Patents and Trademarks*